June 4, 1929.   F. O. CARLSON   1,716,113
TIRE CHAIN LOCK
Filed Oct. 25, 1927
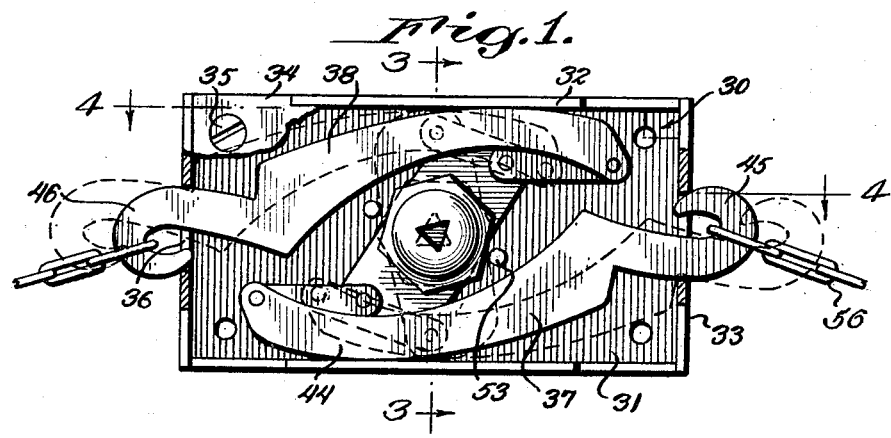
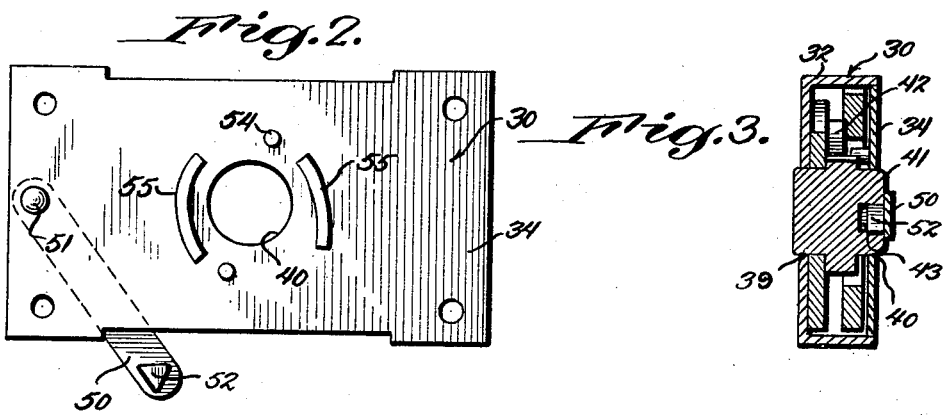
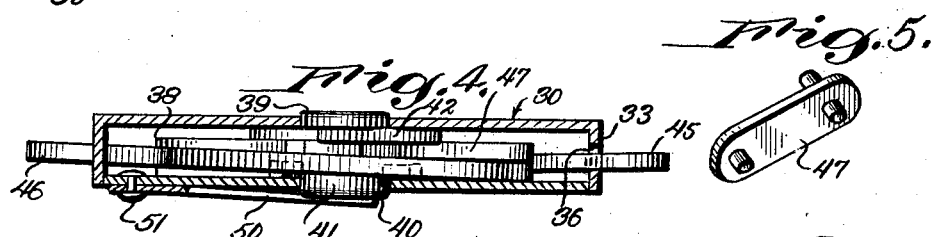
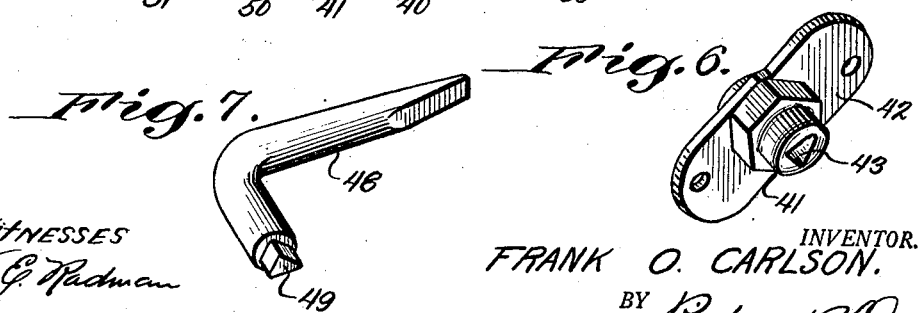
WITNESSES
F. G. Wadman
INVENTOR.
FRANK O. CARLSON.
BY Richard B. Owen
ATTORNEYS.

Patented June 4, 1929.

1,716,113

UNITED STATES PATENT OFFICE.

FRANK O. CARLSON, OF MINNEAPOLIS, MINNESOTA.

TIRE-CHAIN LOCK.

Application filed October 25, 1927. Serial No. 228,667.

This invention relates to locks, and has for one of its objects to provide a novel, simple, durable and inexpensive device of this character which shall be especially adapted to be used for the purpose of connecting the ends of the side chains of antiskid attachments for automobile tires, which may be readily connected to or disconnected from the chains, and which shall be adapted to be easily operated to effect the tightening of the chains when it is desired to secure the attachments to the tires or easily operated to effect the loosening of the chains when it is desired to remove the attachmens from the tires.

With the foregoing and other objects in view, the invention consists in the novel construction, arrangement and formation of parts, as will be hereinafter more specifically described, claimed, and illustrated in the accompanying drawings, in which drawings:

Figure 1 is a side elevation of the improved lock for the anti-skid chain with the cover plate broken away, parts of the walls of the casing being in section, Figure 2 is a side elevation of the cover plate showing the inside thereof, Figure 3 is a transverse section of the lock taken on the line 3—3 of Figure 1 looking in the direction of the arrows, Figure 4 is a longitudinal section through the lock taken on the line 4—4 of Figure 1 looking in the direction of the arrows, Figure 5 is a detail perspective view of one of the novel links utilized in the lock, Figure 6 is the throw lever shown in perspective, for the operating arm, and Figure 7 is a detail perspective view of the crank utilized for operating the lock.

The lock comprises a casing 31 having side and end walls 32 and 33. The casing receives a detachable cover plate 34 which can be held in place in any desired way such as by screws 35. The end walls 33 are provided with openings 36 through which project the locking arms 37 and 38 as will be later described. The inner or bottom wall of the casing and the cover plate 34 are provided with central openings 39 and 40 respectively and these openings receive the ends of a hub 41. This hub 41 forms a salient part of the lock and has projecting from the opposite sides thereof the laterally extending throw arms 42. One face of the hub is provided with a polygonal shaped recess or socket 43 for a purpose which will also be later described. The locking arms 37 and 38 include arcuate body portions 44 and the outer ends of these body portions are provided with outwardly extending hooks 45 and 46 respectively. It is to be noted that the hooks 45 and 46 extend at an angle to the arcuate body portions 44 of the arms 37 and 38 and that when the arms are drawn inwardly that the bills of the hooks 45 and 46 lie within the openings 36 and the end walls of the casing and thus these bills are completely closed.

The inner ends of the body portions of the locking arms 37 and 38 are connected by means of links 47 with the opposite sides of the arms or levers 42 adjacent to the outer ends thereof. Due to the connection of the locking arms 37 and 38 with the hub 41, the locking arms will, when the hub is turned, be moved inward or outward of the casing according to the direction of rotation of the hub. A suitable operating crank 48 is provided for turning the hub and the inner end of the crank provided with a polygonal extension 49 for fitting in the socket or recess 43 in the hub.

When the crank is not in use, the hub is prevented from accidental rotation by the use of a leaf spring 50 which is pivotally connected at one end as at 51 to the cover of the casing and the opposite end of the spring is provided with a polygonal shaped lug 52 which is adapted to be snapped in the recess or socket 43 of the hub when the spring is placed over the hub, as can be readily understood by referring to Fig. 3 of the drawings.

In order to limit the movement of the hub stop pins 53 are carried by the casing and stop pins 54 by the cover plate 34. These stop pins are disposed in the path of the arms or levers 42 and prevent these arms from swinging beyond a predetermined point.

In order to effectively guide the locking arms 37 and 38 and to insure the proper movement thereof, the cover plate 34 has its inner face provided on each side of the openings 40 with arcuate guide pieces or flanges 55 and these pieces terminate adjacent to the inner edges of said locking arms 37 and 38. The ends of the guide flanges 55 afford means for guiding the arms laterally and away from the hub 41.

In practice two of the locks are used in connection with each anti-skid attachment or device. When the anti-skid device is applied to the tire, one lock is arranged at the inner side and the other at the outer side of the tire. Before the application of the anti-skid device to the tire, the locks are operated in a manner to effect the projection of their arms 37 and 38, and one of the arms of each lock is engaged with one of the terminal links of each side chain of the anti-skid device, as suggested at 56 in Figure 1. After the application of the anti-skid device to the tire, the other terminal links of the side chains are engaged with the other arms of the locks. The locks are then operated in a manner to effect the retraction of the arms, with the result that the side chains are tightened and the hooks drawn into the openings 36. After the spring 50 is engaged with the hub 41 the anti-skid device will be securely held on the tire. To remove the anti-skid device, it is only necessary to operate the locks in a manner to effect the projection of the arms 37 and 38. With the arms 37 and 38 in their projected position the tire chains may be disengaged from certain of the arms, and the anti-skid device thereafter removed from the tire.

Changes in details may be made without departing from the spirit or the scope of this invention, but:

What I claim as new is:

1. In a lock for anti-skid tire chains for vehicle wheels, a casing including a bottom wall, side walls and end walls, a cover plate, the cover plate and bottom wall being provided with alined openings, the end walls having openings, and a hub rotatably mounted in said casing and supported by the walls of the openings in the bottom plate and cover plate, radially extending throw arms on the hub, outwardly extending locking arms carried by the casing having hooks formed on the terminals thereof projecting through said openings in the end walls, and links connecting the inner ends of the locking arms with said throw arms, the bills of the hooks being adapted to lie within the openings in the end walls, when the arms are drawn to an inward contracted closed position.

2. In a lock for anti-skid tire chains for vehicle wheels, a casing including a bottom wall, side walls and end walls, a cover plate, the cover plate and bottom wall being provided with alined openings, the end walls having openings, and a hub rotatably mounted in said casing and supported by the walls of the openings in the bottom plate and cover plate, radially extending throw arms on the hub, outwardly extending locking arms carried by the casing having hooks formed on the terminals thereof projecting through said openings in the end walls, links connecting the inner ends of the locking arms with said throw arms, the bills of the hooks being adapted to lie within the openings in the end walls, when the arms are drawn to an inward contracted closed position, and means for rotating the hub.

3. In a lock for anti-skid tire chains for vehicle wheels, a casing including a bottom wall, side walls and end walls, a cover plate, the cover plate and bottom wall being provided with alined openings, the end walls having openings, and a hub rotatably mounted in said casing and supported by the walls of the openings in the bottom plate and cover plate, radially extending throw arms on the hub, outwardly extending locking arms carried by the casing having hooks formed on the terminals thereof projecting through said openings in the end walls, links connecting the inner ends of the locking arms with said throw arms, the bills of the hooks being adapted to lie within the openings in the end walls, when the arms are drawn to an inward contracted closed position, and means for rotating the hub, and means for engaging the hub to hold the same against accidental rotation.

4. A lock comprising a casing provided at opposite sides with openings, arms arranged within the casing and projecting therefrom through said openings, a hub rotatably arranged in the casing and provided with throw arms, links connecting said first arms to the throw arms to permit said first arms to be projected or retracted by the hub, and hooks carried by the outer ends of said first arms and closed by the casing when said arms are in retracted position.

In testimony whereof I affix my signature.

FRANK O. CARLSON.